United States Patent [19]
Kidde

[11] 3,870,786
[45] Mar. 11, 1975

[54] REMOVAL OF PHOSPHATE COMPOUNDS FROM FLUORIDE CONTAINING SOLUTIONS

[76] Inventor: Gustave E. Kidde, 201 South Lake Avenue, Pasadena, Calif. 91101

[22] Filed: Mar. 26, 1973

[21] Appl. No.: 345,112

Related U.S. Application Data

[63] Continuation of Ser. No. 89,126, Nov. 12, 1970, abandoned.

[52] U.S. Cl................. 423/484, 423/341, 423/472, 423/483, 423/488
[51] Int. Cl...... C01b 7/22, C01b 7/00, C01b 33/00
[58] Field of Search ............ 423/488, 483, 472, 341

[56] References Cited
UNITED STATES PATENTS

| | | | |
|---|---|---|---|
| 2,981,601 | 4/1961 | Kidde | 423/483 |
| 3,342,750 | 9/1967 | Kearby | 252/437 |
| 3,386,892 | 6/1968 | Schmidt et al. | 423/472 X |
| 3,592,590 | 7/1971 | Knarr | 423/472 |
| 3,755,546 | 8/1973 | Lichstein et al. | 423/341 X |

FOREIGN PATENTS OR APPLICATIONS 1,095,859  12/1967  Great Britain ...................... 423/341

Primary Examiner—Edward Stern
Attorney, Agent, or Firm—Lyon and Lyon

[57] ABSTRACT

A process for removing phosphate compounds such as phosphoric anhydride ($P_2O_5$) from fluoride containing solutions such as dilute hydrofluoric acid (HF) or fluosilicic acid ($H_2SiF_6$) is disclosed. This process involves the precipitation of aluminum phosphate ($AlPO_4$) from the acidic fluoride containing solutions. The precipitation is brought about by the addition of an aluminum salt such as aluminum fluoride ($AlF_3$), aluminum chloride hydrate ($AlCl_3 \cdot 6H_2O$), aluminum nitrate [$Al(NO_3)_3 \cdot 9H_2O$], aluminum sulfate [$Al_2(SO_4)_3 \cdot 13\text{-}1/2H_2O$], aluminum ammonium sulfate [$Al_2(SO_4)_3 \cdot (NH_4)_2SO_4 \cdot 24H_2O$] and triammonium aluminum hexafluoride [$(NH_4)_3AlF_6$]. The pH is then adjusted to at least about 3 and the phosphoric anhydride is removed by precipitation.

11 Claims, No Drawings

REMOVAL OF PHOSPHATE COMPOUNDS FROM FLUORIDE CONTAINING SOLUTIONS

This is a continuation of application Ser. No. 89,126, filed Nov. 12, 1970, now abandoned.

BACKGROUND OF THE INVENTION

The field of the invention is inorganic chemistry and more specifically relates to processes for utilizing fluorine containing compounds in solution. One such use of fluorine containing compounds in solution is the production of synthetic cryolite ($Na_3AlF_6$) from dilute solutions of hydrofluoric acid. One such process is disclosed in applicant's application Ser. No. 802,274 filed Feb. 25, 1969 and now U.S. Pat. No. 3,556,717, issued Jan. 19, 1971, which is incorporated by reference herein to illuminate the background of the present invention. The presence of dissolved phosphoric anhydride in these fluorine containing solutions makes them unsuitable for further processing to useful compounds such as synthetic cyrolite or aluminum fluoride.

The manufacture of phosphoric acid, diammonium phosphate, triple super phosphate and other phosphatic chemicals from phosphate rock and sulfuric acid produces fluosilicic acid ($H_2SiF_6$) as a by-product. This by-product fluosilicic acid contains varying amounts of dissolved phosphoric anhydride ($P_2O_5$). This dissolved phosphoric anhydride prevents the further use of the fluosilicic acid in the production of aluminum fluoride or synthetic cryolite. Further, dilute solutions of hydrogen fluoride are produced in the thermal process of defluorinating phosphate rock for use as a cattle feed supplement. This hydrofluoric acid solution contains dissolved phosphoric anhydride which constitutes a phosphate contaminant making the solution unsuitable for further processing to aluminum fluoride or synthetic cryolite.

SUMMARY

It has been discovered that phosphate contaminants such as dissolved phosphoric anhydride ($P_2O_5$) may be removed from fluorine-containing solutions such as fluosilicic acid and dilute hydrofluoric acid solutions. This removal can be brought about by the addition of an aluminum salt followed by an adjustment of the pH to about 3.0. This results in a precipitation which is removed from the solution leaving fluoride containing solutions which may be readily processed to aluminum fluoride, synthetic cryolite or the like by accepted procedures.

DESCRIPTION OF THE PREFERRED EMBODIMENTS

It is believed that the addition of aluminum containing compounds to solutions which contain phosphate contaminants such as phosphoric anhydride ($P_2O_5$) results in a precipitation in the form of aluminum phosphate ($AlPO_4$). Any aluminum containing compound of sufficient solubility may be used in the practice of the present invention. We have found the following aluminum salts to be particularly effective: Aluminum fluoride ($AlF_3$), aluminum chloride hydrate ($AlCl_3 \cdot 6H_2O$), aluminum nitrate [$Al(NO_3)_3 \cdot 9H_2O$], aluminum sulfate [$Al(SO_4)_3 \cdot 13\frac{1}{2}H_2O$], aluminum ammonium sulfate [$Al_2(SO_4)_3 \cdot (NH_4)_2SO_4 \cdot 24H_2O$] and triammonium aluminum hexafluoride [$(NH_4)_3AlF_6$]. The effectiveness of phosphate removal is dependent upon proper pH control and it has been found that a minimum pH between 2.6 and 3.1 results in essentially complete removal of phosphoric anhydride ($P_2O_5$). Since the fluoride containing solutions tend to be highly acidic it is usually necessary that neutralization agents be added to bring the solution to the proper pH. The choice of neutralization agents is not critical and is dependent upon solubility and economic considerations. The following materials have been successfully used: Ammonia, sodium hydroxide, sodium carbonate, potassium carbonate and potassium hydroxide.

The colorimetric analysis for phosphoric anhydride in a medium containing fluorine and silica requires the removal of both of these constituents prior to colorimeter determination for phosphoric anhydride content. This may be done by taking a sample to dryness and then fuming with hydrogen fluoride to remove silica ($SiO_2$) followed by treatment with perchloric acid ($HClO_4$) for fluorine removal. The remaining phosphoric anhydride is then determined by the molybdate-stannous chloride method. The percentage transmittance at $650\mu$ was determined for known solutions of phosphoric anhydride. A curve was then drawn which was then later used to determine phosphoric anhydride concentration. The following transmittance results were used to form a basic curve for colorimetric determination of phosphoric anhydride:

| $P_2O_5$ Concentration Grms/100 ml. | % Transmittance at $650\mu$ |
|---|---|
| 0.05 | 20 |
| 0.04 | 22 |
| 0.03 | 26 |
| 0.02 | 32 |
| 0.01 | 44 |
| 0.005 | 60 |
| 0.002 | 74 |
| 0.001 | 86 |

The present invention can be more fully understood by reference to the illustrative examples which follow.

EXAMPLE 1

The solution to be treated contained 200 grams of $H_2SiF_6$ to which had been added 5.52 grams of $H_3PO_4$. This resulted in a $P_2O_5$ concentration of 1.93 percent. Next, 4.5 grams of $AlF_3$ were dissolved in the solution. Each sample contained 200 grams of 15 percent of $H_2SiF_6$ and 5.52 grams of $H_3PO_4$. The solution was ammoniated with aqua ammonia to different pH levels and the resulting precipitate was filtered and washed with water. The results are shown in Table No. 1 below:

TABLE NO. 1

ALUMINUM FLUORIDE ADDITION

| % $P_2O_5$ | Grs. $AlF_3$ | Grs. Aqua | pH | Filtrate Grams | % $P_2O_5$ |
|---|---|---|---|---|---|
| 1.93 | 4.5 | 31.9 | 6.3 | 185.5 | 0.002 |
| 1.93 | 4.5 | 35.9 | 7.4 | 169.5 | 0.0005 |
| 1.93 | 4.5 | 39.9 | 7.4 | 186.7 | nil |
| 1.93 | 4.5 | 43.9 | 7.5 | 172.0 | nil |
| 1.93 | 4.5 | 25.8 | 2.0 | 186.5 | 0.3 |
| 1.93 | 4.5 | 28.8 | 3.0 | 221.4 | nil |
| 1.93 | 4.5 | 31.2 | 4.0 | 209.7 | nil |
| 1.93 | 4.5 | 34.8 | 5.0 | 217.8 | nil |

EXAMPLE 2

The above procedure was repeated except that triammonium hexafluoride was substituted for the aluminum fluoride of Example 1. The results are shown in Table No. 2 below:

TABLE NO. 2

REMOVAL OF $P_2O_5$ FROM $H_2SiF_6$ SOLUTION USING $(NH_4)_3AlF_6$ AT 3.0 pH

| Grs. 29% $NH_3$ | pH Slurry | Grs. Dry Cake | Wgt. Filtrate | Wgt. Sample | %$P_2O_5$ |
|---|---|---|---|---|---|
| 32.0 | 3.0 | 5.2 | 245.9 | 2.0 | 0.04 |

EXAMPLE 3

Aluminum chloride hydrate was successfully used as a source of aluminum to remove varying amounts of $P_2O_5$ from 15 percent fluorosilicic acid solutions. The pH was adjusted by ammoniation. Each sample contained 200 grams of 15 percent $H_2SiF_6$. The results are as follows:

TABLE NO. 3

ALUMINUM CHLORIDE ADDITION

| Sample No. | Grs. $H_3PO_4$ | Acid % $P_2O_5$ | Grs. $AlCl_3$ $6H_2O$ | Grs. Aqua |
|---|---|---|---|---|
| 1 | 1.38 | 0.49 | 3.41 | 27.0 |
| 2 | 1.38 | 0.49 | 3.41 | 31.0 |
| 3 | 1.38 | 0.49 | 3.41 | 35.0 |
| 4 | 1.38 | 0.49 | 3.41 | 39.0 |
| 5 | 2.76 | 0.98 | 6.82 | 29.5 |
| 6 | 2.76 | 0.98 | 6.82 | 35.5 |
| 7 | 2.76 | 0.98 | 6.82 | 37.5 |
| 8 | 2.76 | 0.98 | 6.82 | 41.5 |
| 9 | 5.52 | 1.93 | 13.64 | 31.9 |
| 10 | 5.52 | 1.93 | 13.64 | 35.9 |
| 11 | 5.52 | 1.93 | 13.64 | 39.9 |
| 12 | 5.52 | 1.93 | 13.64 | 43.9 |
| 13 | 8.28 | 2.86 | 20.46 | 34.3 |
| 14 | 8.28 | 2.86 | 20.46 | 38.3 |
| 15 | 8.28 | 2.86 | 20.46 | 42.3 |
| 16 | 8.28 | 2.86 | 20.46 | 46.3 |
| 17 | 11.04 | 3.77 | 27.28 | 36.7 |
| 18 | 11.04 | 3.77 | 27.28 | 40.7 |
| 19 | 11.04 | 3.77 | 27.28 | 44.7 |
| 20 | 11.04 | 3.77 | 27.28 | 48.7 |
| 21 | 13.80 | 4.63 | 34.10 | 39.1 |
| 22 | 13.80 | 4.63 | 34.10 | 43.1 |
| 23 | 13.80 | 4.63 | 34.10 | 47.1 |
| 24 | 13.80 | 4.63 | 34.10 | 51.1 |
| 25 | 5.52 | 1.93 | 13.64 | 29.0 |
| 26 | 5.52 | 1.93 | 13.64 | 33.1 |
| 27 | 5.52 | 1.93 | 13.64 | 35.2 |
| 28 | 5.52 | 1.93 | 13.64 | 38.0 |

| Sample No. | pH | Filtrate Grs. | % $P_2O_5$ | Wash Grs. In | Out |
|---|---|---|---|---|---|
| 1 | 2.5 | 219.1 | 0.004 | 100 | 108.8 |
| 2 | 4.6 | 217.4 | nil | 100 | 103.5 |
| 3 | 5.7 | 187.4 | nil | 100 | 131.8 |
| 4 | 6.4 | 201.1 | nil | 100 | 120.3 |
| 5 | 2.2 | 229.4 | 0.30 | 100 | 103.7 |
| 6 | 2.3 | 225.8 | 0.075 | 100 | 104.2 |
| 7 | 2.6 | 215.1 | 0.004 | 100 | 103.4 |
| 8 | 3.5 | 213.3 | nil | 100 | 104.2 |
| 9 | 1.8 | 240.2 | 0.02 | 50 | 52.0 |
| 10 | 2.0 | 224.7 | 0.01 | 100 | 103.5 |
| 11 | 2.6 | 208.8 | 0.007 | 100 | 110.4 |
| 12 | 3.3 | 209.6 | nil | 100 | 108.6 |
| 13 | 1.8 | 237.1 | 0.06 | 100 | 105.9 |
| 14 | 1.8 | 220.7 | 0.01 | 100 | 116.2 |
| 15 | 2.1 | 218.2 | nil | 100 | 108.2 |
| 16 | 2.2 | 200.0 | nil | 100 | 110.2 |
| 17 | 2.0 | 230.7 | 0.002 | 100 | 105.5 |
| 18 | 2.0 | 229.9 | 0.002 | 100 | 107.4 |
| 19 | 2.1 | 235.1 | 0.001 | 100 | 111.1 |
| 20 | 2.2 | 231.5 | nil | 100 | 111.1 |
| 21 | 2.0 | 239.9 | 0.01 | 100 | 113.4 |

TABLE NO. 3-Continued

ALUMINUM CHLORIDE ADDITION

| Sample No. | Grs. $H_3PO_4$ | Acid % $P_2O_5$ | Grs. $AlCl_3$ $6H_2O$ | Grs. Aqua |
|---|---|---|---|---|
| 22 | 1.8 | 249.9 | 0.003 | 100 | 107.7 |
| 23 | 1.8 | 240.8 | 0.001 | 100 | 108.5 |
| 24 | 1.8 | 221.4 | nil | 100 | 112.0 |
| 25 | 2.0 | — | 0.02 | — | — |
| 26 | 3.0 | — | nil | — | — |
| 27 | 4.0 | — | nil | — | — |
| 28 | 5.0 | — | nil | — | — |

EXAMPLE 4

Aluminum nitrate was utilized as a source of aluminum with the following results shown in Table 4. Again, each sample contained 200 grams of 15 percent $H_2SiF_6$.

TABLE NO. 4

ALUMINUM NITRATE ADDITION

| Sample No. | Grs. $H_3PO_4$ | Acid % $P_2O_5$ | Grs. $Al(NO_3)_3$ $.9H_2O$ | Grs. Aqua |
|---|---|---|---|---|
| 29 | 1.38 | 0.49 | 5.28 | 27.0 |
| 30 | 1.38 | 0.49 | 5.28 | 31.0 |
| 31 | 1.38 | 0.49 | 5.28 | 35.0 |
| 32 | 1.38 | 0.49 | 5.28 | 39.0 |
| 33 | 2.76 | 0.98 | 10.56 | 29.5 |
| 34 | 2.76 | 0.98 | 10.56 | 33.5 |
| 35 | 2.76 | 0.98 | 10.56 | 37.5 |
| 36 | 5.52 | 1.93 | 21.12 | 31.9 |
| 37 | 5.52 | 1.93 | 21.12 | 35.9 |
| 38 | 5.52 | 1.93 | 21.12 | 43.9 |
| 39 | 8.28 | 2.86 | 31.68 | 34.3 |
| 40 | 8.28 | 2.86 | 31.68 | 38.3 |
| 41 | 8.28 | 2.86 | 31.68 | 42.3 |
| 42 | 8.28 | 2.86 | 31.68 | 46.3 |
| 43 | 11.04 | 3.77 | 42.24 | 36.7 |
| 44 | 11.04 | 3.77 | 42.24 | 44.7 |
| 45 | 13.80 | 4.63 | 52.80 | 39.1 |
| 46 | 13.80 | 4.63 | 52.80 | 43.1 |
| 47 | 13.80 | 4.63 | 52.80 | 47.1 |
| 48 | 13.80 | 4.63 | 52.80 | 51.1 |
| 49 | 5.52 | 1.93 | 21.12 | 29.2 |
| 50 | 5.52 | 1.93 | 21.12 | 33.2 |
| 51 | 5.52 | 1.93 | 21.12 | 35.6 |
| 52 | 5.52 | 1.93 | 21.12 | 39.2 |

| Sample No. | pH | Filtrate Grs. | % $P_2O_5$ | Wash Grs. In | Out |
|---|---|---|---|---|---|
| 29 | 2.8 | 227.9 | 0.000 | 100 | 102.2 |
| 30 | 3.9 | 220.6 | 0.004 | 100 | 104.1 |
| 31 | 4.8 | 213.5 | nil | 100 | 105.9 |
| 32 | 6.7 | 220.2 | nil | 100 | 100.0 |
| 33 | 3.3 | 221.4 | 0.011 | 100 | 103.0 |
| 34 | 4.3 | 217.1 | 0.009 | 100 | 116.6 |
| 35 | 5.6 | 215.8 | 0.009 | 100 | 106.4 |
| 36 | 5.2 | 227.8 | 0.005 | 100 | 121.7 |
| 37 | 5.6 | 220.6 | 0.002 | 100 | 114.0 |
| 38 | 7.1 | 219.1 | nil | 100 | 108.3 |
| 39 | 2.0 | 242.0 | 0.002 | 100 | 113.6 |
| 40 | 2.7 | 228.9 | 0.001 | 100 | 115.1 |
| 41 | 3.3 | 227.0 | nil | 100 | 111.3 |
| 42 | 4.8 | 219.8 | nil | 100 | 113.1 |
| 43 | 3.0 | 249.0 | 0.003 | 100 | 120.6 |
| 44 | 2.2 | 234.7 | nil | 100 | 106.4 |
| 45 | 3.1 | 248.1 | 0.001 | 100 | 132.7 |
| 46 | 2.3 | 248.5 | nil | 100 | 125.8 |
| 47 | 2.0 | 244.2 | nil | 100 | 122.4 |
| 48 | 2.0 | 234.7 | nil | 100 | 116.3 |
| 49 | 2.0 | — | 0.02 | — | — |
| 50 | 3.0 | — | nil | — | — |
| 51 | 4.0 | — | nil | — | — |
| 52 | 5.0 | — | nil | — | — |

EXAMPLE 5

Aluminum sulfate was used as an aluminum source resulting in complete removal of $P_2O_5$ at a pH of 3.0.

Each sample contained 200 grams of $H_2SiF_6$. The results are shown in Table No. 5:

TABLE No. 5

ALUMINUM SULFATE ADDITION

| Sample No. | Grs. 100% $H_3PO_4$ | % $P_2O_5$ | Grams $Al_2(SO_4)_3 \cdot 13\frac{1}{2}H_2O$ | Grams Aqua $NH_3$ |
|---|---|---|---|---|
| 53 | 1.41 | 0.50 | 4.20 | 28.0 |
| 54 | 1.41 | 0.50 | 4.20 | 32.0 |
| 55 | 1.41 | 0.50 | 4.20 | 36.0 |
| 56 | 2.82 | 1.00 | 8.40 | 31.0 |
| 57 | 2.82 | 1.00 | 8.40 | 34.6 |
| 58 | 2.82 | 1.00 | 8.40 | 39.2 |
| 59 | 5.64 | 2.00 | 16.80 | 33.0 |
| 60 | 5.64 | 2.00 | 16.80 | 37.1 |
| 61 | 5.64 | 2.00 | 16.80 | 40.6 |
| 62 | 8.46 | 3.00 | 25.20 | 36.2 |
| 63 | 8.46 | 3.00 | 25.20 | 40.1 |
| 64 | 8.46 | 3.00 | 25.20 | 43.3 |

| Sample No. | pH | Grms. | Filtrate % $P_2O_5$ |
|---|---|---|---|
| 53 | 2.0 | 228 | 0.04 |
| 54 | 2.5 | 226 | 0.01 |
| 55 | 3.0 | 229 | nil |
| 56 | 2.0 | 220 | 0.03 |
| 57 | 2.5 | 211 | 0.02 |
| 58 | 3.0 | 223 | nil |
| 59 | 2.0 | 230 | 0.004 |
| 60 | 2.5 | 220 | 0.003 |
| 61 | 3.0 | 223 | nil |
| 62 | 2.0 | 240 | 0.002 |
| 63 | 2.5 | 226 | 0.002 |
| 64 | 3.0 | 224 | nil |

EXAMPLE 6

Instead of using fluosilicic acid solutions containing $P_2O_5$, hydrofluoric acid solutions were used in this experiment. Results show that $P_2O_5$ can be successfully removed from hydrofluoric acid solutions by the process of this invention. Each 200 gram sample contained 12.0 grams HF and 3.0 grams $P_2O_5$. The data are shown in Table No. 6:

TABLE No. 6

$P_2O_5$ REMOVAL FROM DILUTE HF USING ALUMINUM SALTS AND AMMONIA

| Al Salt Used | Grms. | 2.0 pH | 3.0 pH | 4.0 pH | 5.0 pH |
|---|---|---|---|---|---|
| $AlCl_3 \cdot 6H_2O$ | 10.5 | 0.05 | nil | nil | nil |
| $Al(NO_3)_3 \cdot 9H_2O$ | 16.0 | nil | nil | nil | nil |
| $AlF_3$ | 3.7 | 0.01 | nil | nil | nil |
| $(NH_4)_3AlF_6$ | 8.5 | 0.05 | 0.003 | nil | nil |
| $Al_2(SO_4)_3 \cdot 13\frac{1}{2}H_2O$ | 12.5 | 0.02 | 0.003 | nil | nil |

From the foregoing specifications and examples it can be seen that many variations of the present invention are possible. A primary feature of the invention is the removal of phosphate contaminates from acidic fluoride solutions which treated solutions can then be utilized for further processing to useful chemicals. The reactions are carried out at ambient conditions of temperature and pressure. The reaction rates are such that the precipitate is formed without undue delay and no heating is required. The solubility of the resulting aluminum phosphate precipitate is such that no additional cooling is required to assure essentially complete removal of phosphoric anhydride. The reaction may thus be simply carried out in unheated equipment at atmospheric pressure. The precipitate is readily removed by settling or filtration. Other aluminum salts having sufficient solubility may be used in place of the aluminum salts disclosed. Adjustment of pH may be carried out by the addition of other bases than the ones disclosed above as long as their solubility is sufficient and they do not themselves constitute a contaminant for further processing of the fluoride solution. Thus, it can be seen that the foregoing examples and specification are merely illustrative examples of the invention and should not be taken as limiting the scope of the present invention because it is Applicant's intent that the scope of the present invention be limited only by the lawful scope of the claims which follow.

I claim:

1. A process for the removal of phosphate contaminants from impure fluosilicic acid and hydrofluoric acid aqueous solutions having a pH of less than 2.6 comprising:
    adding to said solution a water soluble aluminum salt in an amount sufficient to precipitate any phosphate contaminants as aluminum phosphate;
    decreasing the acidity of said solution to a pH of at least 2.6 to 3.1; and
    separating the resulting precipitate from the resulting phosphate contaminant free solution.
2. The process of claim 1 wherein said water soluble aluminum salt is $AlF_3$.
3. The process of claim 1 wherein the aluminum salt is $AlCl_3 \cdot 6H_2O$.
4. The process of claim 1 wherein the aluminum salt is $Al_2(SO_4)_3 \cdot 13\frac{1}{2}H_2O$.
5. The process of claim 1 wherein the aluminum salt is $Al_2(SO_4)_3 \cdot (NH_4)_2SO_4 \cdot 24H_2O$.
6. The process of claim 1 wherein the aluminum salt is $(NH_4)_3AlF_6$.
7. The process of claim 1 wherein said solution is neutralized by ammoniation.
8. A process for the removal of phosphoric anhydride from aqueous solutions of acidic fluorine containing compounds selected from the group consisting of fluosilicic acid ($H_2SiF_6$) and hydrofluoric acid (HF) said solution having a pH of less than 2.6 comprising:
    adding a water soluble aluminum salt to said solutions in an amount sufficient to precipitate any phosphoric anhydride as aluminum phosphate, said salt being selected from the group consisting of aluminum fluoride ($AlF_3$), aluminum chloride hydrate ($AlCl_3 \cdot 6H_2O$), aluminum nitrate [$Al(NO_3)_3 \cdot 9H_2O$], aluminum sulfate [$Al_2(SO_4)_3 \cdot 13\frac{1}{2}H_2O$], aluminum ammonium sulfate [$Al_2(SO_4)_3 \cdot (NH_4)_2SO_4 \cdot 24H_2O$] and triammonium aluminum hexafluoride [$(NH_4)_3AlF_6$];
    decreasing the acidity of said solution to a pH of at least about 3: and
    separating the resulting precipitate from the resulting purified solution.
9. The process of claim 8 wherein the pH is adjusted by the addition of ammonia.
10. A process for the removal of phosphoric anhydride from aqueous solutions of acidic fluorine containing compounds selected from the group consisting of fluosilicic acid ($H_2SiF_6$) and hydrofluoric acid (HF) said solution having a pH of less than 2.6 comprising:
    adding aluminum fluoride ($AlF_3$) in an amount sufficient to precipitate any phosphoric anhydride as aluminum phosphate;
    decreasing the acidity of said solution to a pH of at least about 3; and
    separating the resulting precipitate from the resulting purified solution.
11. The process of claim 10 wherein the pH is adjusted by the addition of ammonia.

* * * * *